(No Model.)
L. DE NAEYER.
PIPE COUPLING.
No. 253,988. Patented Feb. 21, 1882.
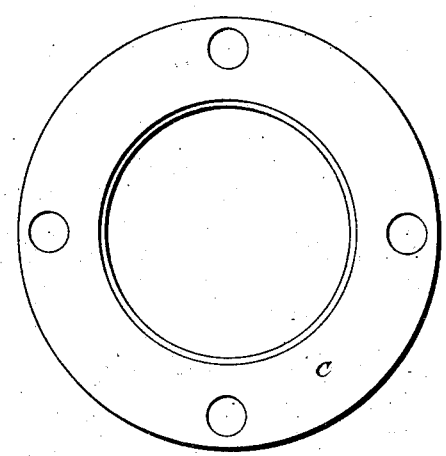
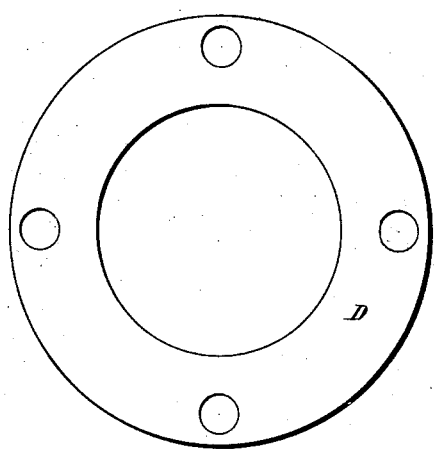
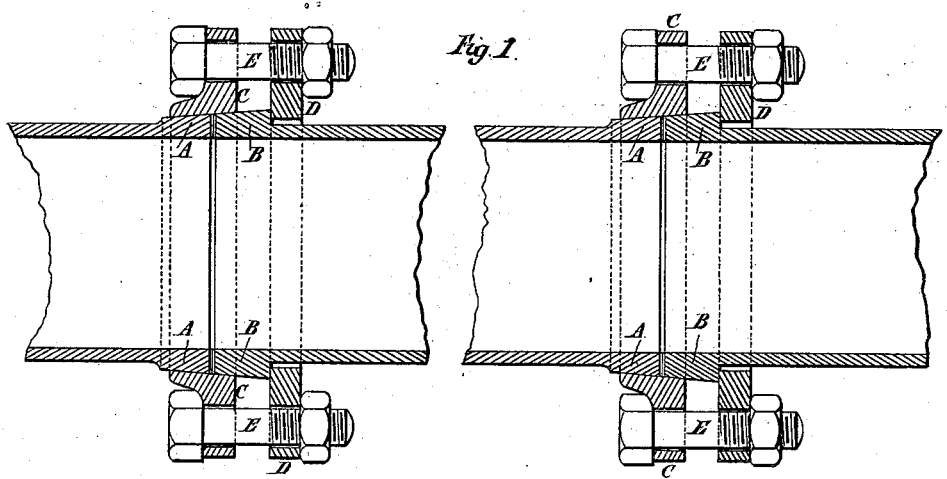
Witnesses.
Albert H. Norris.
Robert Everett.
Inventor.
Louis de Naeyer.
By James L. Norris.
Atty

UNITED STATES PATENT OFFICE.

LOUIS DE NAEYER, OF BRUSSELS, BELGIUM, ASSIGNOR TO NAEYER & CO., OF SAME PLACE.

PIPE-COUPLING.

SPECIFICATION forming part of Letters Patent No. 253,988, dated February 21, 1882.

Application filed November 21, 1881. (No model.) Patented in Belgium May 13, 1879.

*To all whom it may concern:*

Be it known that I, LOUIS DE NAEYER, of Brussels, Belgium, have invented a new and useful Improvement in Pipe-Couplings, (for which I have obtained a patent in Belgium, No. 48,204, bearing date May 13, 1879,) of which the following is a specification.

My invention relates to an improved means for uniting the ends of water, gas, steam, or other pipes or tubes in such a manner that the joint will be perfectly tight and secure.

My invention consists in the combination of pipes or tubes having at their adjoining or meeting ends external conical flanges, together forming, when the pipes or tubes meet, the frustum of a cone, with a ring having its inner side beveled, a collar or ring held upon one of the pipes, and connecting-bolts passing through said rings.

This invention is clearly illustrated in the accompanying drawings, in which Figure 1 is a longitudinal central section representing the ends of three pipes with the appliances for uniting the same. Fig. 2 is an end view of a ring hereinafter described. Fig. 3 is a similar view of a collar hereinafter described.

According to my invention the end of each pipe is made or provided with an inclined or conical projection, A B, as clearly shown in Fig. 1, and the faces of these projections are turned perfectly true. The inclination of the projection on one pipe coincides with that on the pipe to which it is to be joined in such a manner that when the two pipes are placed together end to end the two projections together form the frustum of a single cone, the inclination of the part A being a continuation of that of the part B. (See Fig. 1.) The end of the part B, which forms the base of the cone, constitutes a shoulder or abutment, against which a movable collar, D, bears. To unite the ends of the two pipes the ring C is caused to slide over and upon the parts A B, the interior of the said ring C being bored accurately, so as to have an inclination exactly coinciding with that of the parts A B of the pipes. Then the whole is tightened by means of bolts E, apertures being provided in the collar D and in the ring C, as shown, for the insertion of the said bolts. One of the ends of each pipe is left unsoldered until after the collar D and ring C have been applied.

Having thus described my invention, what I claim, and desire to secure by Letters Patent, is—

1. The combination of the pipes having at their meeting ends the external conical flanges, A B, conjointly forming, when the ends of the pipes meet, the frustum of a cone, with the ring C, having its inner side beveled, substantially as described, the ring D, held upon one of the pipes, and the bolts E, passing through said rings, substantially as and for the purpose set forth.

2. The combination of the pipes having at their meeting ends the external conical flanges, A B, conjointly forming, when the ends of the pipes meet, the frustum of a cone, with ring C, having its inner side beveled, substantially as described, the ring D, arranged to abut against the end of the beveled flange B, and the bolts E, passing through said rings, as and for the purpose set forth.

LOUIS DE NAEYER.

Witnesses:
   A. FIFIS,
   AD. STEIN.